United States Patent
Bick et al.

(10) Patent No.: US 7,102,086 B2
(45) Date of Patent: Sep. 5, 2006

(54) SWITCH ARRANGEMENT

(75) Inventors: Andrew Raymond Bick, Surrey (GB); Barrowclough Philip, Hampshire (GB); Gary Wingett, Hampshire (GB); Helen Louise Haws, Surrey (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/478,578

(22) PCT Filed: Jun. 15, 2001

(86) PCT No.: PCT/GB01/02633

§ 371 (c)(1),
(2), (4) Date: Jun. 25, 2004

(87) PCT Pub. No.: WO02/103731

PCT Pub. Date: Dec. 27, 2002

(65) Prior Publication Data

US 2004/0238340 A1    Dec. 2, 2004

(51) Int. Cl.
    *H01H 9/00*    (2006.01)
(52) U.S. Cl. ............... 200/5 A; 200/310; 200/406; 200/512
(58) Field of Classification Search ............... 200/512, 200/511, 5 A, 310–314, 406, 513
    See application file for complete search history.

(56) References Cited

U.S. PATENT DOCUMENTS

| | | | | |
|---|---|---|---|---|
| 4,365,120 A | * | 12/1982 | Pounds | 200/5 A |
| 4,499,343 A | * | 2/1985 | Prioux et al. | 200/5 A |
| 4,916,275 A | * | 4/1990 | Almond | 200/516 |
| 5,646,649 A | | 7/1997 | Iwata et al. | 345/173 |

FOREIGN PATENT DOCUMENTS

| | | |
|---|---|---|
| EP | 1065688 A2 | 1/2001 |
| EP | 1076442 A2 | 2/2001 |

\* cited by examiner

*Primary Examiner*—Richard Lee
(74) *Attorney, Agent, or Firm*—Harrington & Smith, LLP

(57) ABSTRACT

A switch arrangement is disclosed. The arrangement comprises a number of switches arranged on a substrate, each switch having a resiliently deformable conductive dome for making an electrical connection with a corresponding contact on the substrate; and a number of signal lines for connection to a microprocessor for signalling an operation of a switch. The switches are arranged such that operation of any given switch creates a unique electrical connection between two of the signal lines and each of the signal lines is electrically connected to a conductive surface of a respective dome. Also disclosed is a cover for a portable electronic apparatus, having a number of user operable keys. The keys are connectable to a microprocessor in the apparatus via electrical connections made using the conductive domes.

14 Claims, 7 Drawing Sheets

SWITCH ARRANGEMENT

FIELD OF THE INVENTION

This invention relates to an input device. The device may replace or supplement part of a conventional keypad comprising a plurality of keys. The device finds particular utility in portable apparatus such as mobile telephones. The device allows for easy customisation of an apparatus incorporating the device.

BACKGROUND OF THE INVENTION

A keypad device, for example as used on a portable telephone, comprises several individual keys. A typical keypad on a portable telephone generally comprises keys for the digits 0–9 as well as the special keys * and #. Additional menu and functions keys, such as volume control, cursor control and call answer/reject keys are generally provided also.

SUMMARY OF THE INVENTION

In order for the microprocessor controlling the telephone to be responsive to inputs using the keys it is necessary to somehow signal to the microprocessor that a given key has been pressed or actuated. In the simplest arrangement, each key would comprise a switch, and each key would therefore require its own unique connection to the microprocessor.

Such a connection scheme would involve a large number of discrete connections to the microprocessor, making the number of inputs to the microprocessor prohibitively large. In order to reduce the size and cost of the microprocessor, it is desirable to be able to minimise the number of discrete connections made to it.

A known solution to this problem is to multiplex the signals before they are passed to the microprocessor. Multiplexing involves processing the signals from the keys such that the number of discrete signal lines which are required can be reduced, One form of multiplexing involves assigning each key to an intersection of a row and column. In this way, a key press can be detected by monitoring which row and which column are connected at any given time.

Such a configuration is termed a key matrix. The matrix uses a number of switches arranged to create a short circuit between any given row and column. The short circuit is detected by continuous monitoring of the signal lines associated with each row and column.

A suitable form of switch is termed a 'key dome'. This is shown at FIG. 1a and takes the form of a hollow dome 100 positioned above a contact 120 on a surface of a suitable substrate, such as a printed circuit board (PCB) 110. In its normal rest state, the dome 100 is remote from the contact 120 and no connection is made. However, when the dome is depressed by a user actuating a key, the dome resiliently deforms as shown in FIG. 1b, and electrical contact is made between the dome and the contact for the duration of the key press. The dome is usually manufactured from a plastics material which has been metalised or otherwise treated on its interior surface to be conductive.

The pressure applied to the key dome is usually applied indirectly through the use of a key secured in position above the keydome, and accessible from the exterior of the apparatus. The key usually bears a legend indicating its function to a user.

Once the pressure on the key is released, the key dome, being resilient, assumes its original configuration, and the electrical connection between the key dome 100 and the contact 120 is broken.

A keypad matrix comprises several such keydomes 100, and a typical arrangement is shown at FIG. 2. Here is shown a keypad matrix suitable for use with a regular numeric keypad of a portable telephone. The letters A, B and C refer to columns of the matrix, and the numbers 1, 2, 3 and 4 refer to rows of the matrix.

According to the customary layout of such keys, the key labelled '1' is positioned above the key dome labelled A1 positioned at the intersection of Column A and Row 1; the key labelled '2' is positioned above key dome A2; and so on, until the key labelled '#' is positioned above key dome C4.

All the key domes in any given row are electrically connected together. For instance, key domes A1, B1 and C1 are connected together by the tracks on the printed circuit board which are shown running horizontally. These tracks are depicted by the solid lines in FIG. 2.

The contacts 120 lying on the surface of the substrate in any given column are electrically connected together. For instance, the contacts at positions A1, A2, A3 and A4 are connected together by tracks partially located on an interior layer of the PCB which are shown running vertically. These tracks are depicted by the broken lines in FIG. 2.

In this example, there are 12 individual keys arranged in a matrix of 4 rows by 3 columns. It can be appreciated that this arrangement results in a saving of five signal lines: rather than there being 12 signal lines—one associated with each key—there are now only seven signal lines, each associated with a respective row or column.

If the user of the apparatus presses the key labelled '5', key dome B2 will be depressed, and electrical connection between column B and row 2 will be made. Connections are detected by the processor by sequentially applying a voltage to each of the column signal lines (A, B, C) and then monitoring the row signal lines (1, 2, 3, 4) to see whether they exhibit a signal at that voltage. If any one of them does exhibit a signal at that voltage, then a connection has been made between the row and that column, and hence a key press is detected, and may be decoded as necessary.

The process is repeated continuously to detect any keypresses, and may be summarised as:

---
Apply a voltage to $m^{th}$ row signal line
    Monitor $1^{st}$ column signal line
        Key press?
    Monitor $2^{nd}$ column signal line
        Key press?
    ...
    Monitor $n^{th}$ column signal line
        Key press?
Increment m and repeat process.

---

The non-numeric keys, such as menu and function keys, normally present on a portable telephone, and previously referred to, may also form part of the matrix, even though they may not appear in a matrix-like configuration to the user i.e. the term 'matrix' refers to the manner of connections, and not necessarily to the physical appearance of the associated switches to a user.

Current portable telephones may typically use a keypad matrix having a total of ten signal lines for connection to the device's microprocessor. That number of signal lines can support a total of up to 25 (5×5) keys. Normally, not all possible connections are used.

Portable telephones are increasingly incorporating functions and features not directly associated with telephony. For instance, it is now quite usual for portable telephones to come equipped with personal organiser functions (e.g. the Nokia® 9110 Communicator). Portable telephones are also available which are equipped with the ability to play computer games. As the displays of portable telephones increase in their capabilities e.g. range of colours, size and resolution, more advanced games can be offered.

A problem with offering a user of the telephone a gaming experience comparable with a dedicated gaming device is the limitation in user input caused by the configuration of the input keys. The configuration of the keypad is generally dictated by the primary function of the apparatus, which in this case is telephony. Hence, the apparatus requires a numeric keypad arranged in a manner familiar to the user. This can be incompatible with the requirements of a keypad for gaming purposes. Further, the tactile response of keys using key domes may not be appropriate for gaming use, where keys may be operated repetitively at relatively high frequencies.

Dedicated handheld gaming devices such as the Nintendo® Gameboy, shown in FIG. 3 offer user input keys in a configuration optimised for game play. This configuration is significantly different to the configuration preferred for telephony functions.

FIG. 3 shows a gaming console 300 having a display 310. Beneath the display are provided several game control keys, including: a direction controller 320 comprising four different switches corresponding to four different directions; two game-specific control keys 330; and two system control keys 340.

In the field of portable telephones, it is known to provide user-changeable front covers for telephones to enable a user of the telephone to customise the appearance of the telephone. Such covers are available for several telephones produced by the applicant of this application, such as the 5110 telephone, the 3210 telephone and the 3310 telephone.

However, whilst the appearance of the casing may be different, the position and functions of the individual keys are not user-definable: the position of each individual key is dictated by the fixed position of its corresponding key dome forming part of the key matrix on an underlying PCB.

This is illustrated in FIG. 4, which shows an exploded view of a Nokia® 5110 portable telephone. The telephone has a body portion 400 which contains all the electronic circuitry associated with a portable telephone.

The user-removable front cover 420 is adapted to fit the body of the telephone. The front cover 420 may be provided with various surface decoration effects such as different colours, textures and patterns.

The front cover 420 has several apertures 430 each corresponding to a key provided on a plastics material keymat 410 which fits between the front cover 420 and the body 400, when assembled. Each key on the key mat 410 is positioned directly above a corresponding key dome 100 disposed on the body of the telephone. Thus, when the telephone is assembled, pressure on a key protruding through an aperture in the front cover can cause actuation of an associated key dome switch in the body of the telephone.

As can be clearly seen from FIG. 4, the position of the keys accessible to the user via the front cover of the telephone is determined solely by the position of the corresponding key domes with which the keys must co-operate in order to function.

According to a first aspect of the present invention, there is provided a switch arrangement comprising: a plurality of switches arranged on a substrate, each switch comprising a resiliently deformable conductive dome for making an electrical connection with a corresponding contact on the substrate; and a plurality of signal lines for connection to a microprocessor for signalling an operation of a switch, wherein the switches are arranged such that operation of any given switch creates a unique electrical connection between two of the plurality of signal lines and each of the plurality of signal lines is electrically connected to a conductive surface of a respective dome.

Arranging the switch matrix such that the signal lines are accessible from an exterior surface of the domes enables direct connection to be made to the microprocessor via the domes themselves, which act as resilient electrical connectors. In this way, new covers having different arrangements of keys can be added to the apparatus simply, and connection can be made to the microprocessor without any special steps needing to be taken by the user.

According to a second aspect of the present invention, there is provided a cover, for attachment to an electronic apparatus having a plurality of key domes disposed in a predetermined pattern, the cover comprising: a plurality of contacts positioned for registration with conductive key domes of the electronic apparatus; discontinuous electrical pathways between respective ones of the plurality of contacts; and a plurality of user accessible keys arranged such that actuation of respective ones of the plurality of keys completes the electrical pathway between respective pairs of the plurality of contacts.

Covers, particularly front covers, according to embodiments of the invention, have the advantage that the key layout thereon can be made independent of the positions of the key domes on the underlying electronic apparatus. This allows new covers to be added to the basic apparatus, each new cover being optimised for a particular task. Covers may be provided which are optimised for game play, text entry or any other specialised task where a regular numeric key layout is not the preferred option.

The cover provides a network of incomplete circuits which are completed when a given key is operated by a user. In this way, it is possible to signal to the microprocessor which key has been pressed by gaining direct access to the microprocessor via the conductive key domes of the apparatus.

According to a third aspect of the present invention, there is provided a portable radio telephone comprising: a body portion having a plurality of switches, each switch comprising a resiliently deformable conductive dome; and a removable cover attachable to the body portion for co-operation with the domes and comprising a plurality of user operable keys, wherein the relative positions of the keys on the cover are independent of the relative positions of the domes.

An advantage of the present invention is that a manufacturer is able to supply a device, such as a portable telephone, with a default front cover and key arrangement. The individual key switches may be configured to work in a similar fashion to prior art key switches by using finger pressure on a key to deform a key dome and so make an electrical connection with an underlying contact. Such a default front cover can be relatively inexpensive.

In addition to this default mode of operation, it is possible to supply further changeable front covers having different key arrangements suitable for specific purposes. The key arrangements of such covers are not limited by the positions of the key domes arranged on the body of the telephone.

Such front covers may be made available for use with different applications used on the telephone. An example of such an application may be a game. The user may purchase or download a game for his telephone. As an optional extra, he may be able to purchase a new front cover which has a key arrangement which has been optimised for game play.

According to a fourth aspect of the present invention, there is provided a detector for detecting actuation of one of a plurality of switches, each switch being arranged to create a unique electrical connection between two of a plurality of signal lines, wherein the detector is arranged to: apply a known signal to each one of the plurality of signal lines in turn; and monitor the remaining ones of the plurality of signal lines for the presence of the known signal.

In prior art switch matrices, a key press is indicated to a microprocessor by the creation of an electrical connection between any single row and any single column. Therefore, for a matrix having m rows and n columns, a total of m×n switches may be supported.

According to embodiments of the invention, the microprocessor of the telephone is capable of detecting and interpreting an electrical connection between any two signal lines regardless of whether they are both column signal lines or row signal lines. By providing a front cover with an arrangement of switches whereby an electrical connection may be created between any two signal lines, it is possible to increase the number of keys which may be supported by a microprocessor with no corresponding increase in the number of signal lines required.

This result is a direct consequence that the number of connections between different signal lines is limited in the case where a simple key dome matrix configuration is used. As shown, the maximum number of switches possible when there are n+m signal lines is n×m.

However, when the connections are not so restricted, the number of switches which may be supported is given by the well known formula for calculating combinations: nCr, where in this case, n=number of signal lines and r=2 (as two signal lines must be connected to establish a key press).

The mathematical formula for nCr is:

$$nCr = \frac{n!}{(n-r)!r!} \quad (1)$$

For any given number of signal lines it is possible to support more switches if connection is possible between any two of them, than if connection is only possible between individual members of two defined subsets (e.g. rows and columns) of signal lines.

In prior art devices using a matrix switch arrangement, the connections are achieved by a physical short circuit between a key dome and an underlying contact i.e. the connection is made physically within the switch arrangement.

Embodiments of the invention allow such a connection to be made somewhat remote from the actual switch matrix. In some embodiments described, the physical connections are made in a removable front cover i.e. the connections are made distant from the switch matrix, but communicated to the microprocessor through the medium of the key domes which form part of the switch matrix.

BRIEF DESCRIPTION OF THE DRAWINGS

For a better understanding of the present invention, and to understand how the same may be brought into effect, the invention will now be described, by way of example only, with reference to the appended drawings in which.

DETAILED DESCRIPTION OF THE INVENTION

Figure 5:
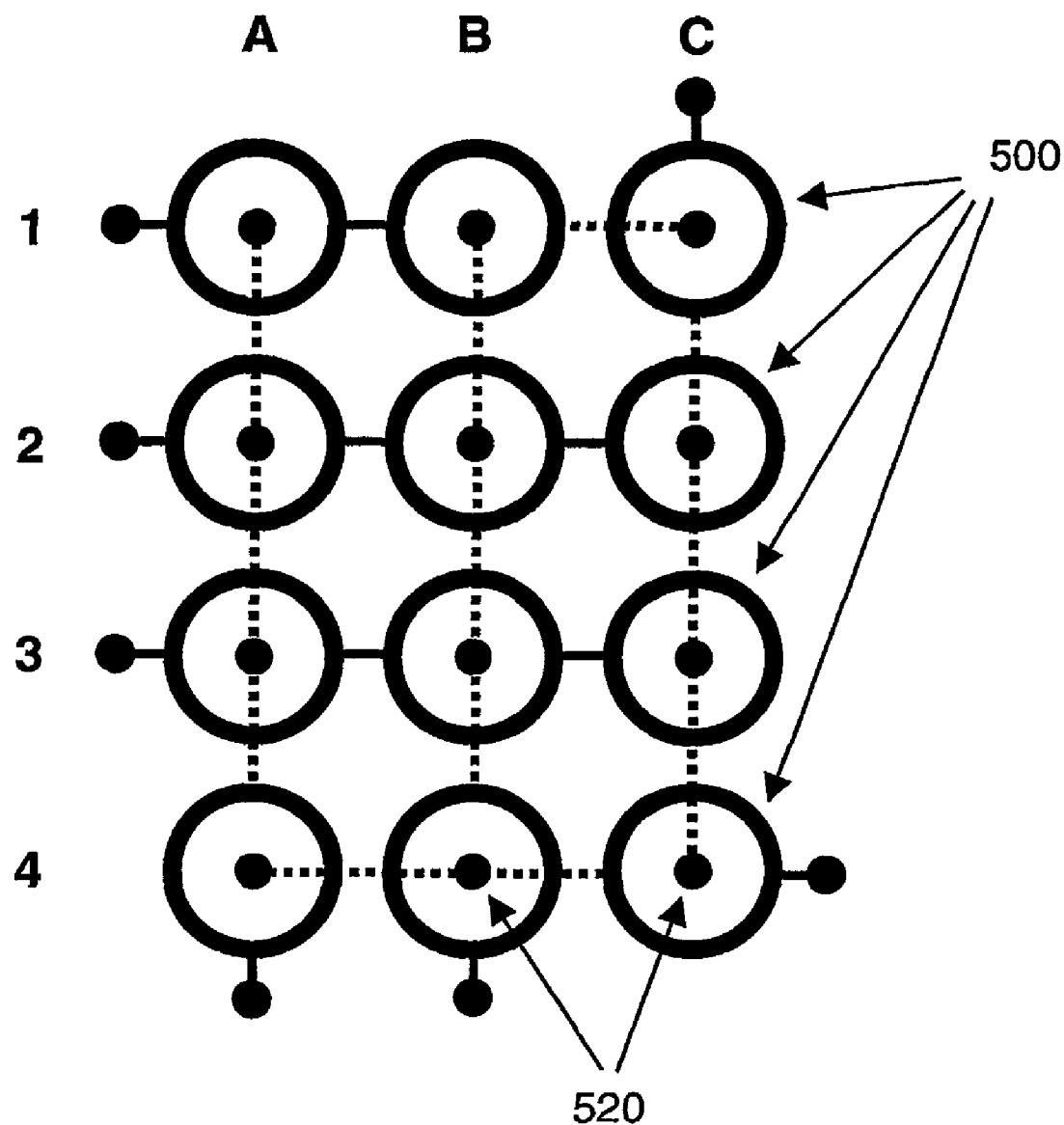
FIG. 5 shows a key switch matrix and associated connections according to an embodiment of the invention.

A key switch matrix according an embodiment of the invention is shown in FIG. 5. The matrix has three columns and 4 rows, and thus is able to accommodate 12 (3×4) switches as shown. The basic mode of operation is as previously described with respect to the prior art matrix of FIG. 2 i.e. depressing a key dome 500 causes it to resiliently deform and so make a connection with the corresponding contact 510 on the surface of a PCB. This connection momentarily connects the row and column at whose intersection the switch lies. This interconnection may be detected and interpreted as previously described in order to react to a key press.

Unlike the prior art key domes, the key domes of embodiments of the invention are manufactured from a metallic material, or from a plastics material treated to be conductive on interior and exterior surfaces and for the surfaces to be electrically connected together.

A difference between the matrix of FIG. 5 and prior art matrices is the manner in which the rows and columns are configured, and which elements of the switch (key domes or contacts) are permanently interconnected.

Figure 1A:
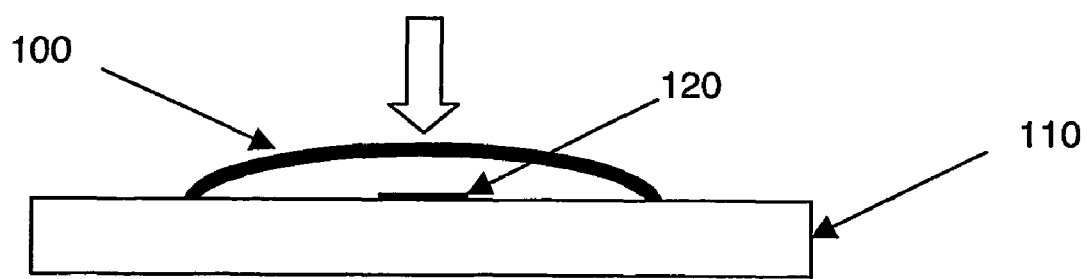
FIGS. 1a & 1b show a cross sectional view of a prior art key dome switch before and after actuation.
Figure 1B:
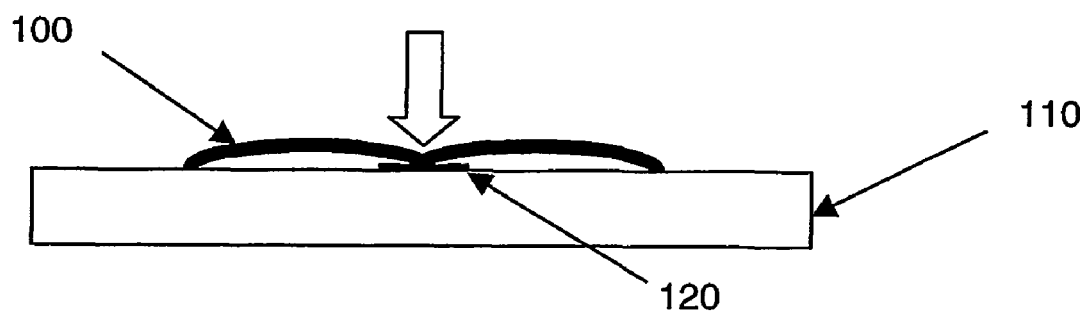
Figure 2:
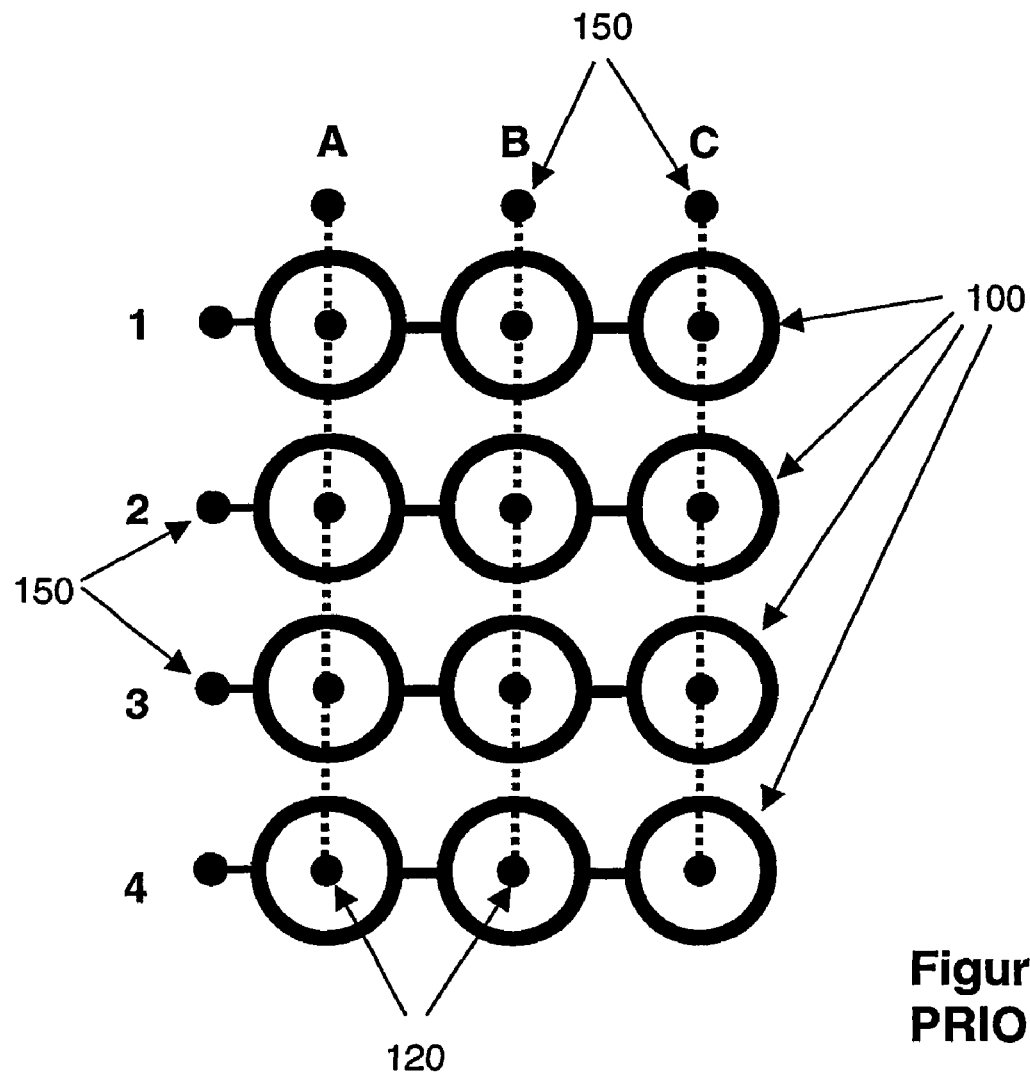
FIG. 2 shows a prior art arrangement of a key switch matrix comprising a plurality of key dome switches.

In the embodiment shown in FIG. 5, it can be seen that the connections between key domes 500 and contacts 510 are significantly different to the connections shown in the prior art matrix of FIG. 2. In the prior art matrix, all the key domes in a given row are mutually interconnected, and all the contacts in a given column are mutually interconnected.

In FIG. 5, the interconnections for the various rows and columns are:

Row 1: KD-A; KD-B; Con-C.
Row 2: KD-A; KD-B; KD-C.
Row 3: KD-A; KD-B; KD-C.
Row 4: Con-A; Con-B; KD-C
Column A: Con-1; Con-2; Con-3; KD-4.
Column B: Con-1; Con-2; Con-3; KD-4.
Column C: KD-1; Con-2; Con-3; Con-4.

The nomenclature used above means that e.g. the permanent interconnections in Row 1 are between the key dome of Column A, the key dome of column B and the contact of column C. The same nomenclature is used for all other rows and columns.

The solid interconnect lines of FIG. 5 represent tracks on the surface of the PCB, and the broken lines represent tracks which are routed on an interior layer of the PCB. Tracks need to be routed on interior layers so that unwanted permanent short circuits do not occur between certain signal lines.

Using this configuration of connections, the same number of signal lines as in the prior art solution are required, hence the same economies of connections to the processor may be achieved. However, embodiments according to the invention can facilitate a number of external connections to the processor. Such connections are possible by making electrical contact to the exposed surface of the conductive key domes. In prior art solutions, the exterior surface of the key domes are generally not conductive, or even if they are, not all signal lines could be accessed in this way as some of the signal lines are only connected to the contacts on the substrate, rendering them inaccessible for external connection.

Embodiments of the invention allow all keypad connections to be made externally accessible for other uses. An example of another use is the addition of a new front cover to a mobile telephone. Unlike the changeable front cover of the prior art shown at FIG. 4, a changeable front cover according to embodiments of the invention may make use of the available connections to the keypad matrix connections via the exposed surfaces of the key domes to allow a different configuration of keys to be adopted on the new front cover. The arrangement of the keys is not limited by the positions of the key domes on the telephone in the way that prior art changeable front covers are. In this way, new covers may be added which are specifically designed for particular functions by arranging keys in optimum positions, and having defined tactile responses.

Figure 3:
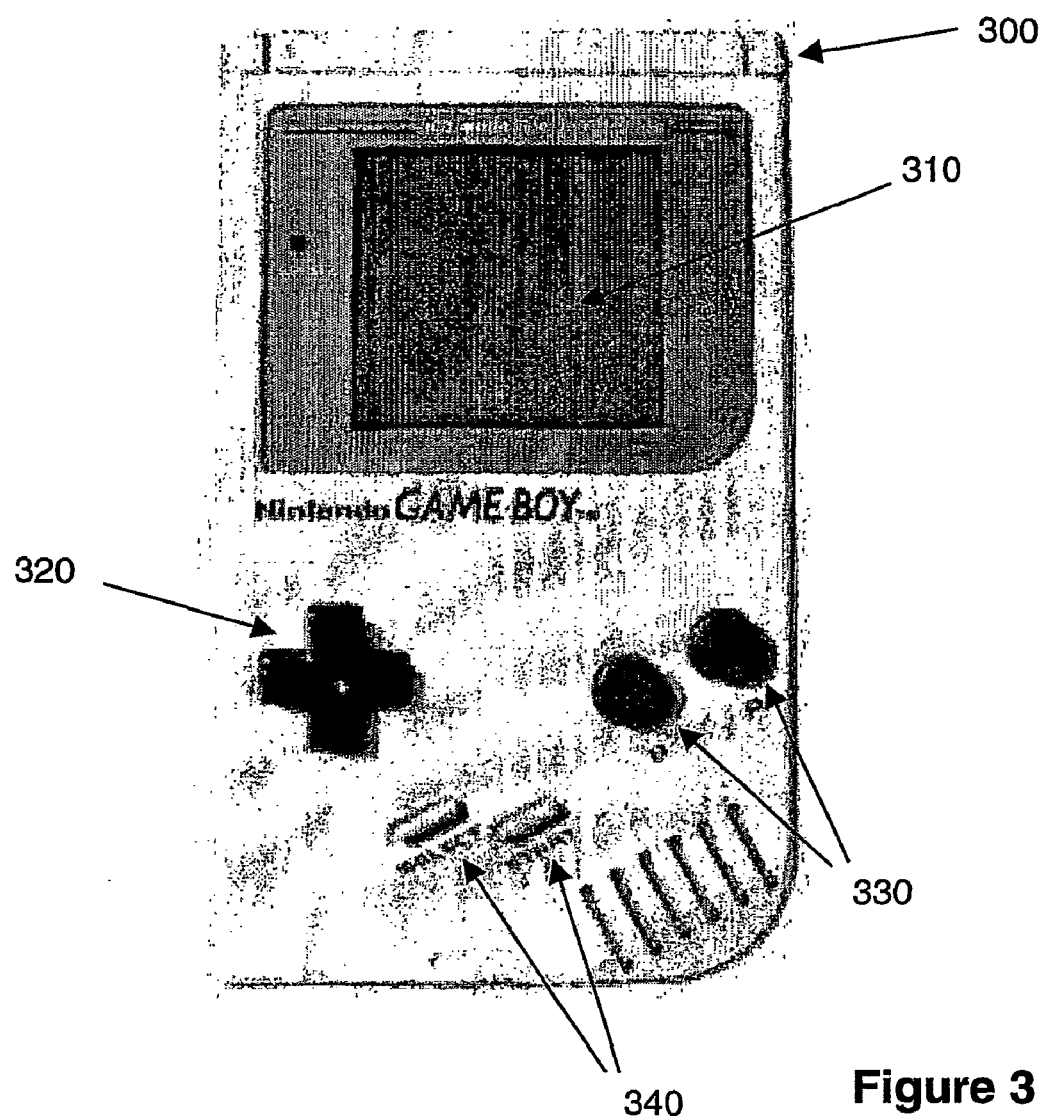
FIG. 3 shows a prior art handheld gaming console.

An example of such a cover may be one which is optimised for gaming use, and may resemble the key layout of the games console shown in FIG. 3. Such a cover may have keys having characteristics which are optimised for gaming purposes. For instance, the tactile response may be designed in a certain way for particular games types.

The configuration of connections shown in FIG. 5 is exemplary only, and other configurations are possible which also achieve the desired effect of making every signal line available via a conductive surface of a key dome.

Additionally, embodiments of the invention allow for more switches to be supported on a changeable front cover. Using the simple matrix switching arrangement of the prior art and relying on deformation of the key domes, it is only possible to create an electrical connection between any row signal line and any column signal line. However, the microprocessor is capable of detecting an electrical connection between any two signal lines, regardless of their designation as row or column.

A front cover according to embodiments of the invention can utilise a more complex switching arrangement than the prior art solution, as it is not limited to making connections only between respective row and column signal lines.

Figure 6:
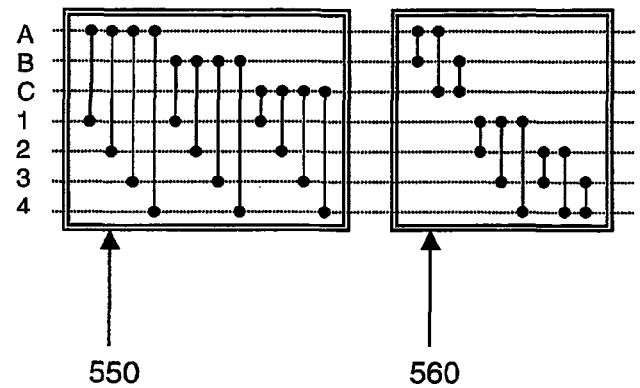
FIG. 6 shows the possible interconnections of the switch arrangement of FIG. 5.

This is illustrated in FIG. 6. The first box 550 shows the twelve connections possible when the switch arrangement of FIG. 5 is operating in a prior art mode, i.e. connections are detected on the basis of a key dome being resiliently deformed and contacting an underlying contact. The vertical lines indicate the connections which are possible between the row signal lines (1, 2, 3, 4) and the column signal lines (A, B, C).

When the switch arrangement of FIG. 5 is operating in a mode according to embodiments of the invention with a front cover arranged accordingly, additional switch combinations may be supported. These extra combinations of connection are shown in the second box 560 of FIG. 6. These connections are in addition to the ones shown in the first box, which are also still possible. Here again, the vertical lines indicate possible connections. Note that it is now no longer only a row signal line which can connect to a column signal line. Any signal line may connect to any other.

In the example shown, with a prior art arrangement of a 4×3 matrix, seven signal lines can support twelve switches. However embodiments according to the invention can support twenty one switches using the same seven signal lines. The figure of 21 is derived from formula (1) given previously, with n=7 and r=2.

Unlike the detection method described in relation to the prior art matrix where each column signal line is energised in turn, and the row signal lines are monitored sequentially to determine whether a connection has been made as the result of a key press, embodiments of the invention operate to energise each signal line (A, B, C, 1, 2, 3, 4) in turn, and monitor each of the remaining signal lines in turn to determine whether a connection has been made.

For example, the process may be:

---

Signal Line A has a voltage applied to it
Signal line B is monitored
Key press?
Signal line C is monitored
Key press?
Signal line 1 is monitored
Key press?
Signal line 2 is monitored
Key press?
Signal line 3 is monitored
Key press?
Signal line 4 is monitored
Key press?
Signal Line B has a voltage applied to it
Signal line A is monitored
Key press?
Signal line C is monitored
Key press?
Etc.

---

In this way, with a simple modification to the microprocessor, it is possible to detect a connection between any two signal lines regardless of whether they are designated as row or column lines. This detection process operates with any type of front cover regardless of whether it is operating in prior art mode relying on depression of the individual key dome switches, or whether it is operating according to embodiments of the invention, in which the key dome switches are not depressed, but rather used as contacts to the signal lines.

As a consequence of being able to support more keys on a front cover according to embodiments of the invention, it is possible to offer a front cover which has a full qwerty-style keyboard without needing to increase the number of signal lines required to connect to the microprocessor.

A typical number of signal lines is ten. Using formula (1), with 10 signal lines (n=10), it is possible to support 45 different switches. This is more than sufficient to support the number of keys required for a full alphanumeric keyboard.

Figure 7:
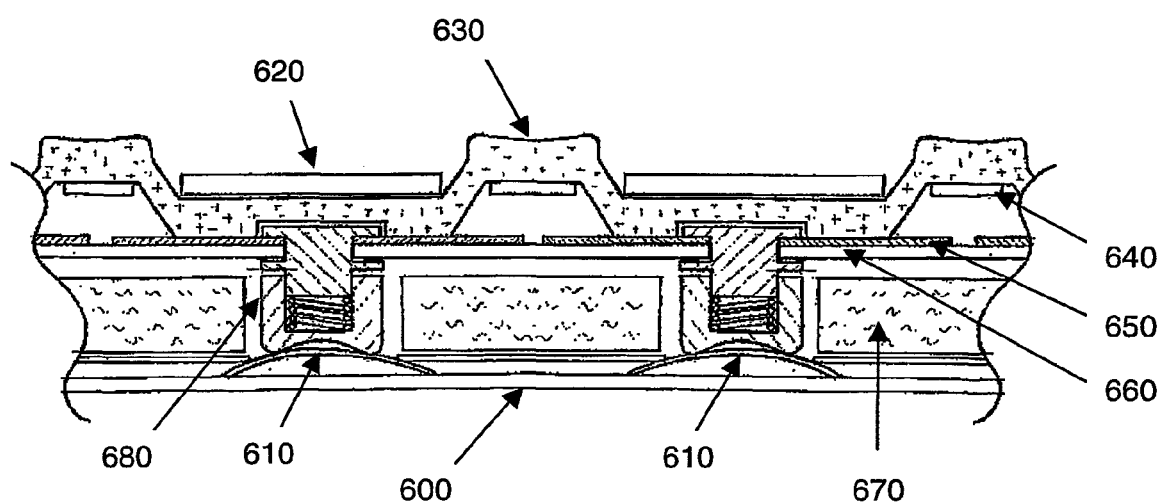
FIG. 7 shows a partial cross-section through a portable telephone having a removable front cover, all according to embodiments of the invention.

FIG. 7 shows a cross section through a front cover attached to a telephone body according to an embodiment of the invention. The front cover is user-removable and may be configured for attachment in a 'snap-on' fashion, or alternatively, the user may be required to use a tool to attach/ detach the front cover. Details of a suitable means of attachment is disclosed in co-assigned patent application EP0883955A.

Figure 4:
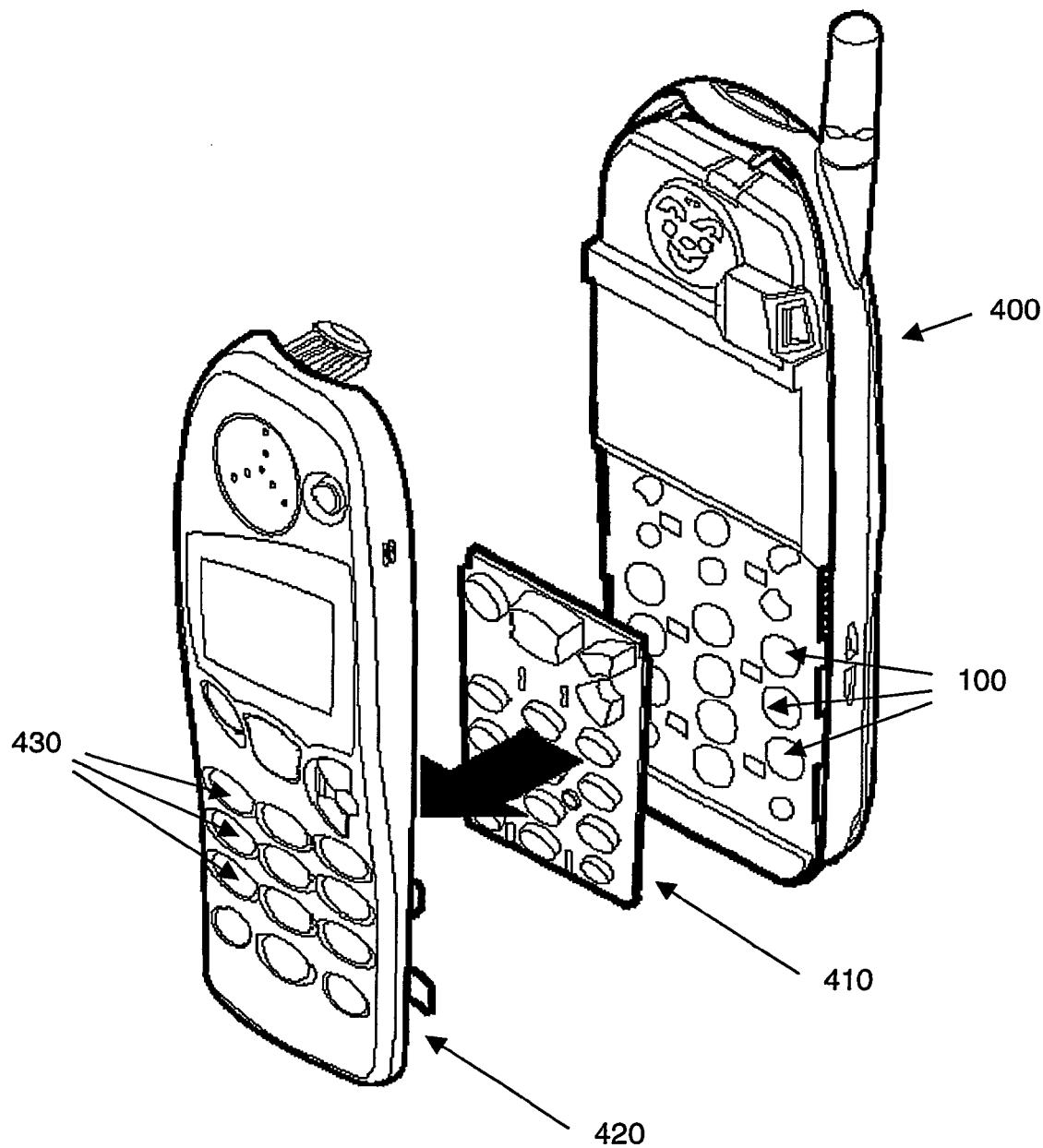
FIG. 4 shows an exploded view of the assembly of a prior art portable telephone having an exchangeable front cover.

Unlike the prior art front cover of FIG. 4, the cover of FIG. 7 may be configured to have an arrangement of keys different to the arrangement of key domes on the surface of the telephone to which it is attached. This is because the actuation of a key on the front cover does not rely on the resilient deformation of a key dome in order to make a contact and signal to the telephone's microprocessor that a key has been pressed. Therefore, there is no need for the key on the front cover to be positioned directly above any particular key dome on the body of the telephone.

Instead, a key press is signalled to the microprocessor by making connections directly between the signal lines connected to the microprocessor. This is possible due to the way in which the key domes have been configured so that each signal line is directly connected to a conductive dome of the key dome arrangement. In effect, the key domes act as electrical contacts for allowing direct connection to the microprocessor. This is in contrast to prior art solutions where the key domes only operated as switches, and not as herein described. Prior art devices can not operate according to embodiments of the invention as the signal line connections were not externally accessible in this way.

The front cover according to embodiments of the invention incorporates a keypad matrix circuit which is distinct from the matrix circuit of the telephone. This operates in a similar manner to the matrix circuit of the telephone, but may use different switch types. The operation of the front cover matrix circuit is described later in relation to FIG. 8. Essentially, each key of the front cover corresponds to a switch integrated into the front cover. The switches are arranged so that actuation of any given switch results in an electrical connection between two signal lines.

The electrical connection between two signal lines is mapped to an electrical connection between two of the signal lines (A, B, C, 1, 2, 3, 4) connected to the microprocessor.

FIG. 7 shows a cross section through a front cover attached to a telephone. The parts 600 and 610 form part of the body of the telephone. The parts 620–680 form part of the removable front cover.

The front surface of the telephone body 600, which is exposed when no cover is present, is a substrate such as a printed circuit board (PCB) on which several key domes 610 are disposed.

Attached to the telephone body is a front cover having a key arrangement which is not dictated by the positions of the key domes 610 on the telephone. The front cover has an exposed surface 620, which may be coloured or patterned as required. The front surface 620 has several apertures through which are exposed user-operable keys 630. The keys may be formed individually or as a key-mat from a silicone rubber or similar material. The exposed surface of the key may carry a legend indicating to a user the function of the key. The rear surface 640 of the key has a conductive element attached or integrally formed. An example of a suitable element may be a so-called 'carbon pill'. This is disc like element composed of conductive carbon.

When a key 630 is pressed, the pill 640 is brought into contact with conductive tracking 650 on the upper surface of PCB 660. The PCB may be manufactured using known methods, and the tracking may be etched copper or printed silver or any other suitable material.

The effect of the pill 640 contacting the tracking 650 is to create an electrical connection between two previously unconnected tracks. The effect produced is similar to depressing a key dome switch in the prior art discussed previously in that the connection formed is made between two signal lines and is a unique indication corresponding to a particular key 630. However, the connections are not limited to being between a row and column signal line.

Figure 8:
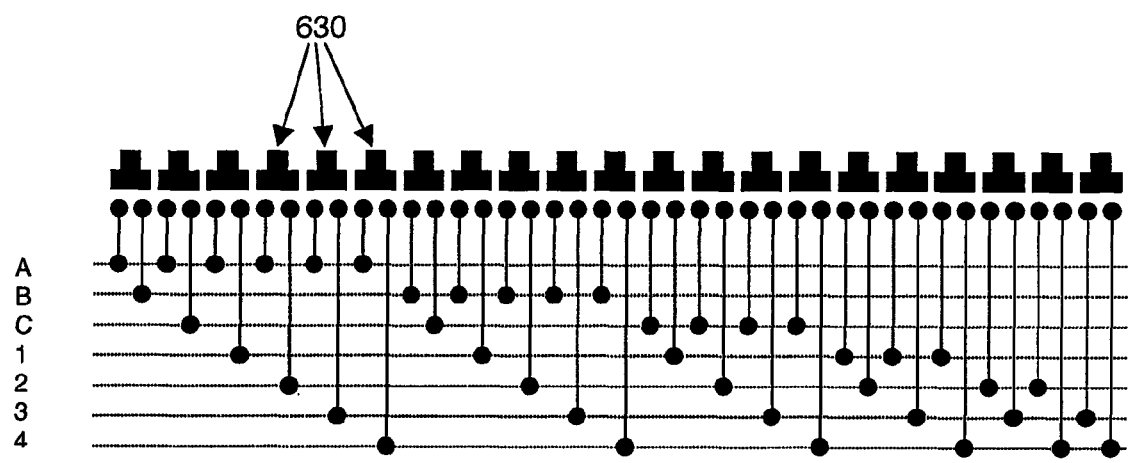
FIG. 8 shows all possible switch arrangements according to an embodiment of the invention.

FIG. 8 shows a possible switch arrangement for use in a front cover connectable to a portable telephone having seven signal lines connected to a microprocessor. Each signal line (A, B, C, 1, 2, 3, 4) is connected to an exterior conductive surface of a respective key dome as previously described. Each signal line is further connected via the resilient connector 680 to tracking 650 on a PCB 660 in the front cover.

The resilient connector 680 is shaped and configured to apply enough force to the key dome 610 to ensure a reliable electrical connection, but not so much force that the key dome is deformed and makes a connection with its underlying contact. Using typically sized and manufactured parts, a force equivalent to a mass of 150 g is needed to deform a key dome sufficiently to make contact according to prior art techniques. A force equivalent to a mass of 80 g is sufficient to ensure a reliable connection between the spring contact 680 and key dome 610 without causing the dome to deform.

Unlike the prior art solution, the tracking can be arranged such that two exposed contacts lie on PCB 660 immediately beneath key 630. When key 630 is depressed, the conductive rear 640 of the key makes an electrical connection between the two contacts, and thus forms a connection between two signal lines.

FIG. 8 shows all 21 connections which are possible using seven signal lines. In the scheme of FIG. 8: signal line A is connectable to B, C, 1, 2, 3 and 4; signal line B is connectable to A, C, 1, 2, 3 and 4, and so on for the other signal lines.

To further enhance the operation of the front cover, it incorporates a light guide 670 which is at least partially transparent and allows light to pass through from light sources on the body of the telephone (not shown) to illuminate the keys 630 of the front cover. For the same reason, the PCB 660 may be constructed from a material which allows light to pass through. The tracking 650 occupies a relatively small area of the PCB and so does not interfere with the passage of the light to a great extent.

The present invention includes any novel feature or combination of features disclosed herein either explicitly or any generalisation thereof irrespective of whether or not it relates to the claimed invention or mitigates any or all of the problems addressed.

The invention claimed is:

1. A cover, for attachment to an electronic apparatus having a plurality of key domes disposed in a predetermined pattern, the cover comprising:
   plurality of contacts positioned for registration with conductive key domes of the electronic apparatus;
   discontinuous electrical pathways between respective ones of the plurality of contacts; and
   a plurality of user accessible keys arranged such that actuation of respective ones of the plurality of keys completes the electrical pathway between respective pairs of the plurality of contacts.

2. A cover as claimed in claim 1 wherein each of the plurality of contacts is resilient and is arranged such that when the cover is attached to the electronic apparatus, the contact provides enough contact force to provide an electrical connection but not so much force that the key dome is substantially deformed.

3. A cover as claimed in claim 1 wherein the position of an individual key is independent of the position of any of one of the plurality of key domes of the electronic apparatus.

4. A cover as claimed in claim 1 wherein the cover comprises more keys than the electronic apparatus has key domes.

5. A cover as claimed in claim 1 wherein the keys are arranged for controlling an electronic game.

6. A cover as claimed in claim 1 wherein a unique key is provided for each letter of the alphabet.

7. A cover as claimed in claim 6 wherein the keys are arranged as a qwerty-style keyboard.

8. A cover as claimed in claim 1 wherein the cover is arranged to be removable by a user of the electronic apparatus.

9. A cover as claimed in claim 1 wherein the cover is a front cover.

10. A cover as claimed in claim 1 comprising a light guide for allowing light to pass through the cover from a surface of the electronic apparatus.

11. A cover as claimed in claim 1 wherein an electrical pathway is completed by a conductive part of a key short connecting two discontinuous electrical pathways.

12. A portable electronic apparatus comprising a body portion having a switch arrangement comprising:

a plurality of switches arranged on a substrate, each switch comprising a resiliently deformable conductive dome for making an electrical connection with a corresponding contact on the substrate;

and a plurality of signal lines for connection to a microprocessor for signaling an operation of a switch, wherein the switches are arranged such that operation of any given switch creates a unique electrical connection between two of the plurality of signal lines and each of the plurality of signal lines is electrically connected to a conductive surface of a respective dome and a cover as claimed in claim 1.

13. A portable radio telephone comprising: a body portion having a plurality of switches, each switch comprising a resiliently deformable conductive dome; and a removable cover comprising means for attachment to the body portion and for co-operation with the domes and comprising a plurality of user operable keys, wherein the relative positions of the keys on the cover are independent of the relative positions of the domes.

14. A removable cover for attachment to the portable radio telephone as claimed in claim 13.

* * * * *

UNITED STATES PATENT AND TRADEMARK OFFICE
CERTIFICATE OF CORRECTION

PATENT NO. : 7,102,086 B2 Page 1 of 1
APPLICATION NO. : 10/478578
DATED : September 5, 2006
INVENTOR(S) : Andrew Raymond Bick et al.

It is certified that error appears in the above-identified patent and that said Letters Patent is hereby corrected as shown below:

Title page, Item (75): Please delete "Barrowclough Philip" and replace with --Philip Barrowclough--

Signed and Sealed this

Twenty-sixth Day of December, 2006

JON W. DUDAS
*Director of the United States Patent and Trademark Office*